United States Patent [19]
Asmuth et al.

[11] Patent Number: 5,272,767
[45] Date of Patent: Dec. 21, 1993

[54] INTERACTIVE DATA ANALYSIS WITH CROSSBAR CONTROL

[75] Inventors: Charles A. Asmuth, Princeton Township, Mercer County; Suz-Hsi Wan, East Brunswick Township, Middlesex County; Peter M. Freitag, Franklin Township, Somerset County, all of N.J.

[73] Assignee: David Sarnoff Research Center, Inc., Princeton, N.J.

[21] Appl. No.: 925,678

[22] Filed: Sep. 18, 1992

Related U.S. Application Data

[63] Continuation-in-part of Ser. No. 608,942, Nov. 5, 1990, abandoned.

[51] Int. Cl.⁵ .............................................. G06K 9/00
[52] U.S. Cl. ........................................ 382/41; 382/1; 382/61; 358/445; 364/725; 345/163
[58] Field of Search ................. 382/61, 27, 28, 41–46, 382/1; 340/712; 364/725; 358/445

[56] References Cited

U.S. PATENT DOCUMENTS

| | | | |
|---|---|---|---|
| 4,413,314 | 11/1983 | Slater et al. | 340/722 |
| 4,860,097 | 8/1989 | Hartnack et al. | 358/133 |
| 4,908,874 | 3/1990 | Gabriel | 382/41 |
| 4,933,892 | 6/1990 | Nakaya et al. | 364/725 |
| 4,935,729 | 6/1990 | Shirai et al. | 340/721 |

OTHER PUBLICATIONS

J. Capowski "The Matrix Transform Processor", IEEE Transaction on Computers, vol. C-25, No. 7, Jul. 1976, pp. 703-712.

*Primary Examiner*—Joseph Mancuso
*Assistant Examiner*—Yon J. Couso
*Attorney, Agent, or Firm*—William J. Burke

[57] ABSTRACT

A management tool is disclosed which aids the user in controlling the flow of data from one database table to another in computer memory, particularly when both the potential amount of data and the number of programmed functions which can be performed upon or be controlled by the data are large. In general, the tool is an interactive method of controlling the programmed flow of data in computer memory from an input table of rows and columns includes the steps of (1) generating a control grid (the crossbar) of rows and columns on a display monitor, (2) assigning each row of the grid to a respectively different column of the input table, (3) assigning each column of the grid to the role a different function a column of the input table may perform in generation of the output table, (4) inserting marks at selected intersections of rows and columns of the grid to set the functions selected columns of the input table perform in generation of the output table, and (5) controlling generation of the output table from data in respective input table columns selected by marks in accordance with the respective functions assigned to grid columns by the same marks.

9 Claims, 4 Drawing Sheets

5,272,767

INTERACTIVE DATA ANALYSIS WITH CROSSBAR CONTROL

FIELD OF THE INVENTION

This application is a continuation in part of U.S. application Ser. No. 07/608942 now abandoned.

This invention relates generally to the field of computer data analysis and, more particularly, to methods and arrangements for using computers to transform data obtained from external sources into processed data.

BACKGROUND OF THE INVENTION

A technical investigator often needs to transform initial data from such external sources as flat computer files, databases, and measuring equipment into processed data with the aid of calculations and transformations in order to make visual presentations and useful summaries. Any tool or device to help in making the link between initial data and data ready for presentation should have a number of qualities: (1) it should be sufficiently general to perform a wide variety of transformations on the data, (2) it should be able to handle data of a sufficiently generic form to be useful in a wide variety of contexts, (3) it should be simple to use, and (4) it should be reconfigurable in an interactive fashion. Simplicity of use particularly means that a user should be able to perform transformations on the data without needing to acquire specialized skills such as learning a general purpose programming language. Interactive reconfiguration is important because frequently an investigator cannot know in advance just what sort of analysis is called for. Frequently, the best course of analysis may only become evident to an investigator as it is taking place.

In the past, most successful screen based interfaces for analysis software have been limited to specialized situations where the data being passed from one point to another are either very simple or very constant in form. In other less specialized situations, unfortunately, such interfaces tend to be of little use.

SUMMARY OF THE INVENTION

The present invention overcomes many of the limitations of the prior art and is particularly valuable in situations where the user has a number of data processing tools from which to choose and tables of data of different degrees of complexity to analyze.

The present invention is, from one aspect, directed to an interactive method of controlling the flow of data in computer memory from an input table of rows and columns of data to an output table of rows and columns of data with the aid of a crossbar or grid on the screen of a video display monitor and a selection device such as a mouse. The method comprises the steps of generating a control grid (the crossbar) of rows and columns on the screen of a video display monitor in which each row of the grid is assigned to a respectively different column of the input table and each column of the grid is assigned to a function that a column of data from the input table may perform in generating the output table, inserting marks at selected intersections of rows and columns of the grid to assign the functions for selected columns of the input table to perform in generating the output table, and controlling generation of the output table from data in respective input table columns selected by marks in accordance with the functions assigned to those columns by the respective marks.

From another point of view, the present invention is directed to an interactive method of managing the flow of data in computer memory from an input table of rows and columns of data to an output table of rows and columns of data under the control of selected functions that a column of data from the input table may perform in generating that output table. The method comprises the steps of generating a control grid (the crossbar) of rows and columns on a display monitor, assigning each row of the grid to a respectively different column of the input table, assigning each column of the grid to a different one of a plurality of predetermined functions, inserting marks at selected intersections of rows and columns of the grid to assign the functions to be performed by the selected columns of the input table in generating the output table, and controlling generation of the output table from date in respective input table columns selected by marks in accordance with the functions assigned to those columns by the respective marks.

The invention will be better understood from the following more detailed explanation of several specific examples, taken in the light of the accompanying drawing and the appended claims.

DETAILED DESCRIPTION

Figure 1:
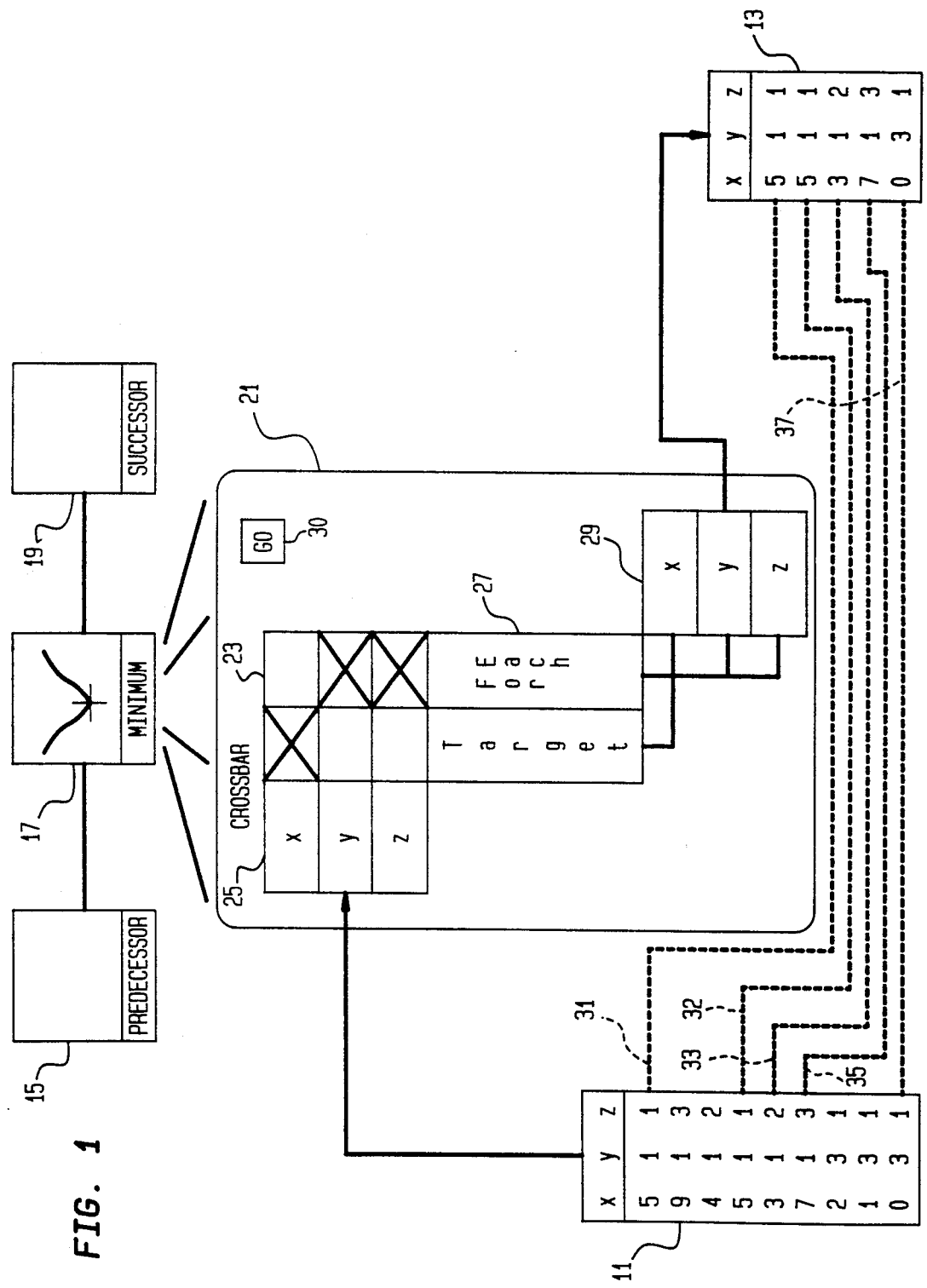
FIG. 1 is a block diagram illustrating one choice of crossbar assignments made with the aid of the invention.

FIG. 1 shows a block diagram composed partially of an input data table 11 of rows and columns and an output data table 13 of rows and columns. Both input table 11 and output table 13 are, by way of example, resident in computer memory (not shown). The remainder of FIG. 1 comprises three processing tool icons 15, 17, and 19, and a configuration view 21, all of which are displayed, by way of example, on a screen of a video display monitor (not shown).

In the interest of clarity, both input table 11 and output table 13 have been kept quite simple in FIG. 1. In practice, of course, both may be far more complex, with more input and output rows and columns and with more functions which can be performed under the control of input data columns. As shown, input table 11 consists of three columns bearing the respective headings x, y, and z. In this example, output table 13 also consists of three columns bearing the respective headings x, y, and z. In the interest of clarity, the data in input table 11 consist of single digit numbers. The invention is in no way limited to such simple data, of course, and the data in input table 11 may be derived from such sources as previous computer processing, other databases, external instrumentation, or combinations of any of them.

Of the processing tool icons, icons 15 and 19 simply represent predecessor and successor tools, respectively, and icon 17 represents the currently selected tool. The selected tool, like any other tool, generates an output table 13 based on input table 11 in a manner according to the characteristics of the selected tool. The process of generating output table 13 requires that columns of input table 11 play various roles. In particular, the selected tool is of a kind which divides input table 11 into collections of rows according to the values of certain columns (designated as "For Each" in FIG. 1) and then selects from each of these collections the "minimum row," that is, the row with the smallest value in an additional specified column (designated as "Target" in FIG. 1). The output table is then composed of these "minimum rows." The predecessor tool represented by icon 15 is any tool which produces a data table as its output and the successor tool represented by icon 19 is any tool which expects a data table as its input.

An important part of the configuration view 21 in FIG. 1 is a control grid 23 consisting of rows and columns. The control grid 23 is the crossbar, a term adopted here because of its visual appearance and because its role is somewhat analogous to that played by the crossbar switches in mechanical telephone switching systems. In the simplified example shown in FIG. 1, control grid 23 consists of only three rows and two columns. The rows of control grid 23 are called x, y, and z to correspond to columns x, y, and z, respectively of input data table 11, as shown by three boxes comprising extension 25 immediately to the left of control grid 23. The columns of control grid 23 are associated with specific role that the columns of input data table 11 may play in the generation of output data table 13. In the example shown in FIG. 1, control grid 23 has two columns. These two columns are associated with roles that the columns of input table 11 may play in the generation of output table 13 as performed by the tool represented by icon 17. Both columns permit the columns of output table 13 to receive data from selected rows of data from input table 11, as indicated by two boxes comprising extension 27 immediately below control grid 23.

In the example shown in FIG. 1, the user employs a conventional computer input device, e.g., a mouse (not shown), to place a mark in control grid 23 for each of the rows of data in input table 11. A first mark in the form of an X is shown placed at the intersection of row x and the left hand column. Like marks are shown placed at the intersections of rows y and z with the right hand column. The marks determine the flow of data to selected columns of output table 13, as indicated by three boxes comprising an extension 29, at the lower left hand corner of extension 27. A GO button 30 is also displayed within configuration view 21 to facilitate process operation. When the GO button 30 is clicked on by an input device such as a conventional computer mouse (not shown), the processes which have been set up can begin or continue operation.

As a result of the operation of control grid 23 with marks in the indicated locations, the data processing tool represented by icon 17 passes to output table 13 the rows of data which contain the minimum value of x for each combination of y and z. In this manner, the first row of input table 11 (5,1,1), which contains the minimum value of x for the combination of y and z represented by 1 and 1, is passed as indicated by dotted line 31. The fourth row of the input table 11 (5,1,1), which also contains the minimum value of x for the combination of y and z represented by 1 and 1, is passed as indicated by dotted line 32. The fifth row of input table 11 (3,1,2) contains the minimum value of x for the combination of y and z represented by 1 and 2 and is passed as indicated by dotted line 33. The sixth row of input table 11 (7,1,3) contains the minimum value of x for the combination of y and z represented by 1 and 3 and is passed as indicated by dotted line 35. Finally, the last row of input table 11 (0,3,1) contains the minimum value of x for the combination of y and z represented by 3 and 1 and is passed as indicated by dotted line 37.

Figure 2:
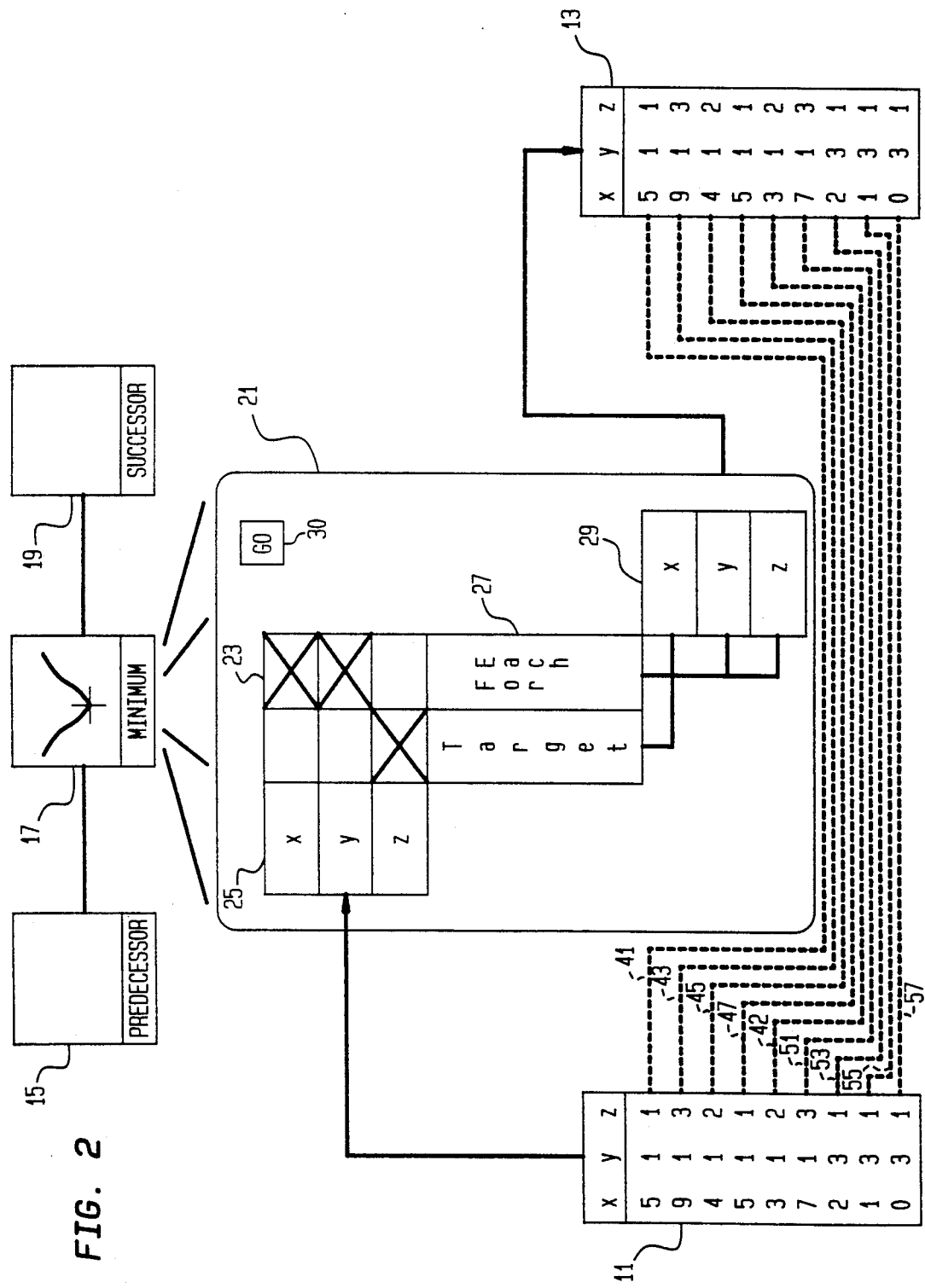
FIG. 2 is a block diagram illustrating another choice of crossbar assignments made with the aid of the invention.

FIG. 2 shows a block diagram very similar to that in FIG. 1 and is made up of the same components, all of which bear the same reference numerals. For the sake of comparison, the data in input table 11 are identical to those in input table 11 in FIG. 1. Also, for the sake of comparison, designated processing tool icon 17 is identical to that in FIG. 1 and selects the minimum value of z for each combination of x and y. The processing tool represented by icon 17 does this because of the different placing of the X marks within control grid 23 in FIG. 2. In FIG. 2, as shown, the user uses a conventional computer input device such as a mouse (not shown) to place the marks at the intersection of control grid row z with the left hand control grid column. Additional marks are placed at the intersection of control grid rows x and y with the right hand control grid column.

As a result of the operation of control grid 23 in FIG. 2 with marks in the new locations, the processing tool represented by icon 17 passes to output table 13 the rows of data which contain the minimum value of z for each combination of x and y. In this manner, the first row of input table 11 (5,1,1) contains the minimum value of z for the combination of x and y represented by 5 and 1 and is passed as indicated by dotted line 41. The second row of input table 11 (9,1,3) contains the minimum value of z for the combination of x and y represented by 9 and 1 and is passed as indicated by dotted line 43. The third row of input table 11 (4,1,2) contains the minimum value of z for the combination of x and y represented by 4 and 1 and is passed as indicated by dotted line 45. The fourth row of input table 11 (5,1,1) is also passed as indicated by line 47, since its value of z is also a minimum among those rows of input table 11 for which x is 5 and y is 1. In the specific example shown in FIG. 2, it happens that all of the remaining rows of table 11 are passed as indicated by dotted lines 49, 51, 53, 55, and 57. Because there is only one row in input table 11 for each combination of values of x and y, all rows are passed.

Figure 3:
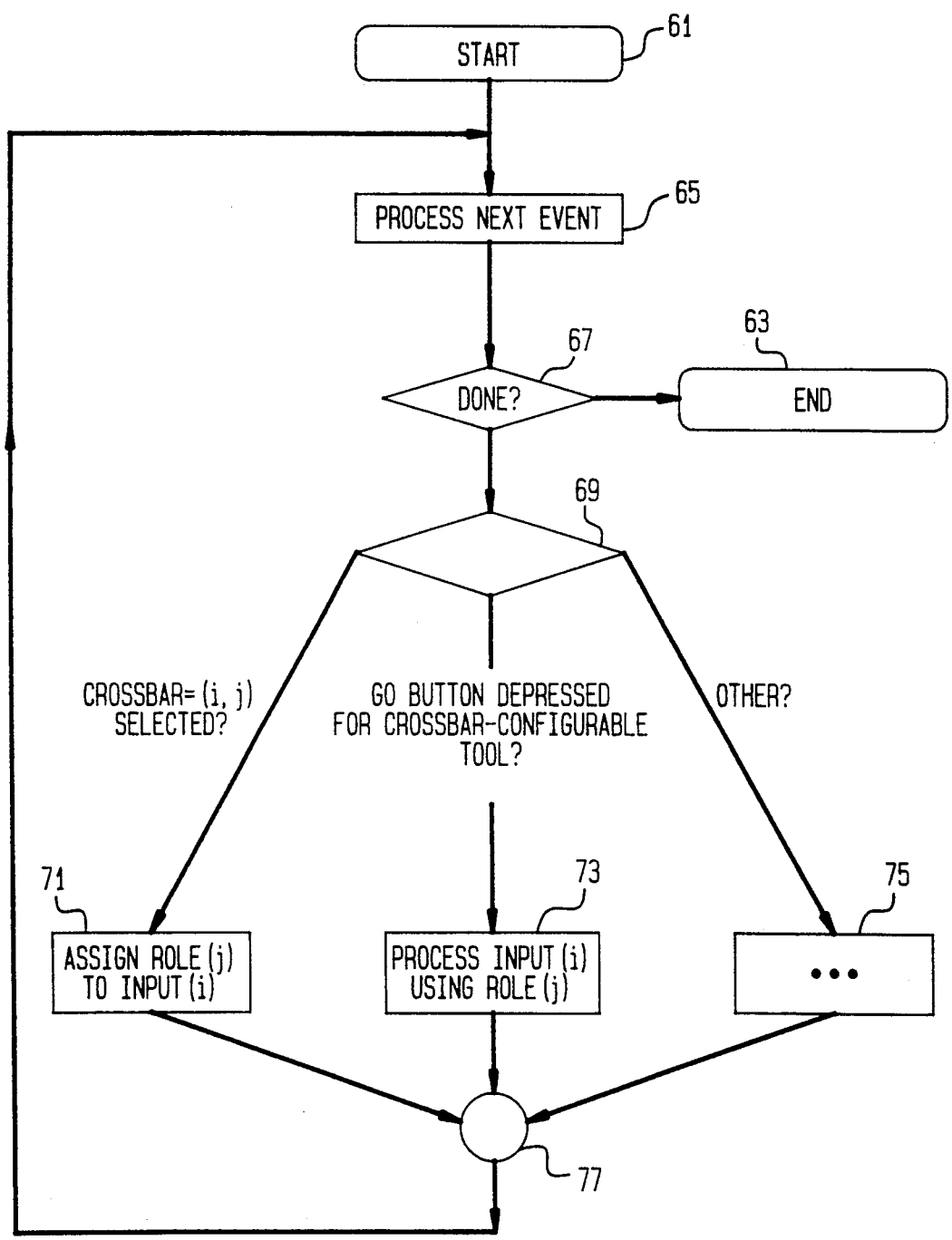
FIG. 3 is a flow chart demonstrating the steps taken in accordance with the invention to implement the assignments shown in both FIGS. 1 and 2.

FIG. 3 is a flow chart which shows where the crossbar fits into a larger process which manages an entire interactive data analysis environment. FIG. 3 shows a variable sequence of steps, beginning with start 61 and finally terminating with end 63. Intermediate steps may include steps 65, 67, 69, 71, 73, 75, and 77. As with many processes which manage visual user interaction, this process is event driven. That is to say, the process repeats indefinitely the sequence of first reading the next event and then reacting to that next event according to the nature of that event. As shown in FIG. 3, the process commences in step 65 by obtaining the next event. Such an event is generally created by user action such as clicking a mouse (not shown) at a certain location on a video monitor screen (not shown). Next, the process determines whether or not the event indicates that the user is finished with the session. If so, the process terminates at step 63. Otherwise the process further examines the event in decision step 69.

If the event was caused by the user clicking the mouse in the crossbar grid, the process proceeds to step 71, in which the role selection indicated by that click is recorded in the crossbar data object and a corresponding mark is drawn on the grid at the location of the click on the video monitor screen.

If the event was caused by the user clicking the mouse on a "GO" button in the tool configuration window on the video monitor screen, the process proceeds to step 73, in which the actual generation of output table 13 takes place. In the course of performing this step, the state of the crossbar data object (as determined at the time step 71 is performed) is used to control the formulation of output table 13.

If the event is caused by some other action (such as the user dragging an icon or opening a window with the mouse) it does not pertain to the crossbar and the response is represented by step 75.

Regardless of the nature of the event analyzed in step 69, after the response is completed by one of steps 71, 73, or 75, the process returns to step 65, in which the next event is obtained and the sequence is repeated.

Figure 4:
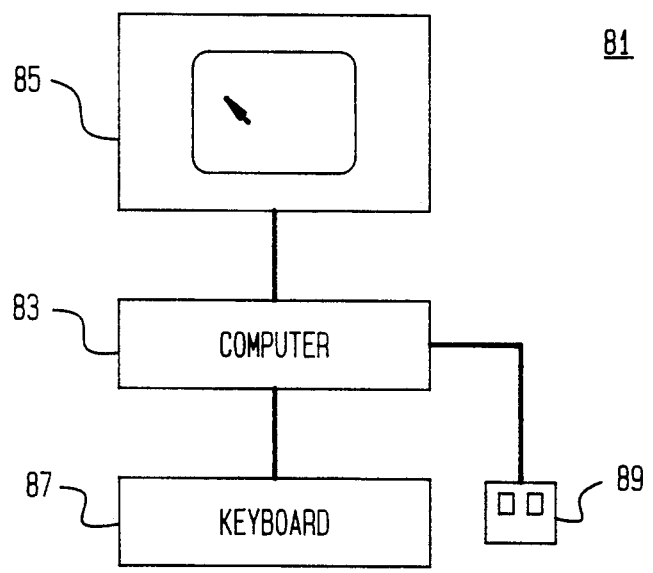
FIG. 4 is a block diagram of a conventional computer assembly of a type to which the invention is readily applicable.

FIG. 4 shows a block diagram of a conventional computer assembly 81 of a type to which the invention is readily applicable. The assembly 81 comprises a digital computer 83, a video monitor 85, a keyboard 87, and a mouse 89. Mouse 89 is an input device which, when dragged across a work surface (not shown), moves a cursor on the screen of video monitor 85 and which includes at least two control buttons. The control buttons on mouse 89 can be clicked to inform computer 83 to select functions to be performed, to perform such functions, or to make or move visible marks on the screen of monitor 85. "Click," in this sense, is simply the term normally used in the art to mean depressing a mouse button.

The invention may be readily implemented upon computer assembly 81 in FIG. 4 by one skilled in the art by using Object Oriented Programming techniques. More specifically, computer 83 may be programmed by one skilled in the art of user interface programming using Objective-C and the class library ICpak 201. Both the compiler for Objective-C and ICpak 201 are available commercially from the Stepstone Corporation of Sandy Hook, Conn. ICpak 201 is disclosed in that company's 1988 publication "ICpak 201 Graphical User Interface, Version 2.0—User Reference Manual."

This portion of the description will begin with some definitions. When an object oriented program runs, entities called objects send messages to each other. When an object receives a message, its response behavior is determined by a method corresponding to that message. An object is an instance of a class. There may be any number of instances of the same class coexisting in a single process. Each object maintains its own copy of what are called instance variables. Thus, each object has behavior as defined by its methods and a state which is reflected in the values of its instance variables. An object may respond to a message by sending messages of its own, by modifying its instance variables, or by sending data back to the sender of the message.

A program in Objective-C is written by writing class definitions. Class definition source code contains lists of instance variable names and routines which implement the methods. Classes are arranged in a hierarchy. Each class has a super-class, except for the original class, which is called the Object. A class automatically inherits all properties of the super-class except for those which are explicitly overridden. Thus, the definer of a new class need only write code for the differences between the super-class and the new class being created.

The remainder of this description assumes familiarity with the concepts of Object Oriented programming, which are generally understood by those skilled in the art. The book by Brad J. Cox, "Object Oriented Programming—An Evolutionary Approach," which was published in 1987 by Addison Wesley in Reading, Mass., is a standard text on the subject and may be referred to for more detailed information.

In particular, Stepstone Objective-C provides a library, called ICpak 201, of user interface classes. The visual aspects of the invention may be deployed as an instance of a class called BaseLayer. BaseLayer is a ICpak 201 class whose instances act as background windows for a user interface application. A process may create a single instance of this class and then send it a message which causes it to process all externally generated events such as mouse clicks or keystrokes. The instance of BaseLayer has displayed on it various other visible objects called front layers. The instance of BaseLayer also sends messages to appropriate front layer objects every time it receives an event. The front layers then respond to these messages in ways determined by their nature as programmed in source code and by their current states.

The control grid or crossbar interface provided by the present invention is a particular example of such a front layer. It may be programmed as a subclass, Crossbar, of an ICpak 201 class called ImageLayer. Instances of ImageLayer have two fundamental qualities. First, they behave as layers in general. That is, they are capable of responding to event messages sent to them by the instance of BaseLayer. Second, they are designed to display an image of a bitmap. An instance of Crossbar has, as its bitmap, the grid or crossbar featured by the present invention. Marks may be placed upon that grid or crossbar with the aid a mouse. This instance has instance variables, beyond those of an instance of ImageLayer, which can retain the crossbar information. Those instance variables determine just which blocks in the control grid or crossbar have been clicked upon by the mouse.

The Crossbar subclass is further programmed, by way of example, so that its instances will react to mouse button clicks in the area of its grid on the video monitor screen by recording the click information in their instance variables. This programming is done by overriding methods defined for the super-class ImageLayer. In particular, ImageLayer has a method called "LeftButtonDown" which defines the response of an instance of ImageLayer to the occurrence of a left mouse button click while the mouse cursor is within the rectangular area of the ImageLayer instance. Instances of ImageLayer do not react to such an event. In the Crossbar class source code file, the programmer writes a LeftButtonDown method which is used by instances of Crossbar in lieu of the trivial method which would otherwise have been inherited from the ImageLayer class. The overriding method first interrogates global variables available to the programmer, using the ICpak 201 classes which record information about the current event, particularly its location. If the location of the mouse cursor upon pressing the left mouse button is within one of the squares of the crossbar grid on the video monitor screen, the method responds by setting a corresponding instance variable.

Finally, an instance of the Crossbar class is also able to respond to a message inquiring about its state. This is accomplished by simply having the method of the message pass back to the sender the values of the instance variables which are set by the LeftButtonDown method. A routine whose purpose is the actual operation on a data table, when about to perform its task, may send such a message to an instance of Crossbar. Conventional programming techniques, well known to those skilled in the art, are adequate for using this information to govern the transformation of an input table to an output table.

Typical source code for implementing at least one embodiment of the invention upon the screen of a computer monitor is attached hereto as an appendix.

It is to be understood that the embodiment of the invention which has been described is illustrative. Numerous other arrangements and modifications may be readily devised by those skilled in the art without departing from the spirit and scope of the invention.

overriding method first interrogates global variables available to the programmer, using the ICpak 201 classes which record information about the current event, particularly its location. If the location of the mouse cursor upon pressing the left mouse button is within one of the squares of the crossbar grid on the video monitor screen, the method responds by setting a corresponding instance variable.

Finally, an instance of the Crossbar class is also able to respond to a message inquiring about its state. This is accomplished by simply having the method of the message pass back to the sender the values of the instance variables which are set by the LeftButtonDown method. A routine whose purpose is the actual operation on a data table, when about to perform its task, may send such a message to an instance of Crossbar. Conventional programming techniques, well known to those skilled in the art, are adequate for using this information to govern the transformation of an input table to an output table.

Typical source code for implementing at least one embodiment of the invention upon the screen of a computer monitor is attached hereto as an appendix.

It is to be understood that the embodiment of the invention which has been described is illustrative. Numerous other arrangements and modifications may be readily devised by those skilled in the art without departing from the spirit and scope of the invention.

APPENDIX

```
/* Copyright 1989,1990 David Sarnoff Research Center */
/* All rights reserved */

/*    Code for a generic analysis tool template    */ import "objc.h"

import "uil.h"

#import "BitMap.h"

#import "CrossBar.h"

@implementation CrossBar: ImageLayer

-initialize {
  int i, j;

[super initialize];

numberOfRows = -1;

numberOfColumns = -1;

for (i=0; i<MAXMATRIX; i++){
    for (j=0; j<MAXMATRIX; j++)
      matrix[i][j] = NO;
  }
  markFlag = YES;

tool = nil;

return self;
}

- (PT)boxSize { return boxSize;

}

- (short)boxWidth { return X(boxSize);
```

```
}

- (short)boxHeight {
  return Y(boxSize);
}

// Factory method
+numberOfRows:(int) numOfRows numberOfCols:(int) numOfCols
     size:(PT)theSize belongsTo:aTool {
  int j, k, border;
  short w,h,x1,y1,l;
  id bits;

if (numOfRows > MAXMATRIX || numOfCols > MAXMATRIX ||
    numOfRows < 1 || numOfCols < 1) return nil;

w = ((X(theSize)+1) * numOfCols) + 1;
  h = ((Y(theSize)+1) * numOfRows) + 1;
  bits = [[[BitMap new]
              extent:pt(w,h)]
              fillColorIndex:[colors.Background
colorIndex]];
  self = [self createInterfaceFor:bits];
  numberOfRows = numOfRows;
  numberOfColumns = numOfCols;
  boxSize = theSize;
  tool = aTool;
  x1 = y1 = 0;
  l = [self boxHeight]+1;
  for(j=0; j<numberOfRows+1; j++){
```

```
    [bits drawLineFrom:pt(x1,y1) to:pt(w,y1)];

y1 += 1;

} x1 = y1 = 0;

l = [self boxWidth]+1;

for(k=0; k<numberOfColumns+1; k++){

[bits drawLineFrom:pt(x1,y1) to:pt(x1,h)];

x1 += 1;

} return self;

}

- markBoxAtRow:(int)row col:(int)col withColor:clr { short xsizeplus1 = [self boxWidth]+1;

short ysizeplus1 = [self boxHeight]+1;

short xleft, xright, ytop, ybottom;

id bits = [self bitMap];

short coloridx = [clr colorIndex];

if (row >= numberOfRows || col >= numberOfColumns
      || row < 0 || col < 0) return self;

xleft = xsizeplus1 * col;

ytop = ysizeplus1 * row;

xright = xleft + xsizeplus1;

ybottom = ytop + ysizeplus1;

[bits drawLineFrom:pt(xleft,ytop) to:pt(xright,ybottom)
        colorIndex:coloridx];

[bits drawLineFrom:pt(xleft,ybottom) to:pt(xright,ytop)
```

```
        colorIndex:coloridx];
  return self;
}

- setRow:(int) row column:(int) column{ if (row >= numberOfRows || column >= numberOfColumns
     || row < 0 || column < 0) return self;

if(!matrix[row][column]) {
    matrix[row][column] = YES;
    [self markBoxAtRow:row col:column withColor:colors.Text];
  }
  return self;
}

- unsetRow:(int) row column:(int) column{ if (row >= numberOfRows || column >= numberOfColumns
     || row < 0 || column < 0) return self;

if(matrix[row][column]) {
    matrix[row][column] = NO;
              [self    markBoxAtRow:row    col:column
withColor:colors.Background];
  }
  return self;
}

- (BOOL)leftButtonDown {
```

```
   PT point = [self asRelative:event.origin];

short xpoint = X(point);

short ypoint = Y(point);

int row, col;

if(xpoint < 0 || ypoint < 0) return NO;

col = xpoint / (X(boxSize)+1);

row = ypoint / (Y(boxSize)+1);

if(row >= numberOfRows || col >= numberOfColumns) return NO;

if(!matrix[row][col]) { if([self columnCheck:col]){ if ([self rowCheck:row]){

[self setRow:row column:col];

[self repaint];

[self newMarkRow:row column:col];

}

}

} else {

[self unsetRow:row column:col];

[self repaint];

[self newUnmarkRow:row column:col];

} return YES;

}

// Interogation methods

- (int)numberOfRows {
```

```
    return numberOfRows;
}

- (int)numberOfCols {
  return numberOfColumns;
}

//  Returns the selected box in a row
- (int)colOfRow:(int) row {
  int i;

if (row >= numberOfRows || row < 0) return -2;
  for (i=0; i<numberOfColumns; i++){
    if(matrix[row][i]) return i;
  } return -1;
}

//  Returns the selected box in a column
- (int)rowOfCol:(int) column {
  int i;

if (column >= numberOfColumns || column < 0) return -2;
  for (i=0; i<numberOfRows; i++){
    if(matrix[i][column]) return i;
  } return -1;
}
```

```
- (short)xCenterAtCol:(int)c {
   short bsize = [self boxWidth]+1;

if(c >= numberOfColumns || c < 0) return -1;
   return (short)((bsize*c) + (bsize/2));
}

- (short)yCenterAtRow:(int)r {
   short bsize = [self boxHeight]+1;

if(r >= numberOfRows || r < 0) return -1;
   return (short)((bsize*r) + (bsize/2));
}

// message when a box is marked
- newMarkRow:(int)row column:(int)column {
   if(tool && markFlag) [tool newMarkRow:row column:column];
   return self;
}

// message when a box is unmarked
- newUnmarkRow:(int)row column:(int)column {
   if(tool && markFlag) [tool newUnmarkRow:row column:column];
   return self;
}

/*
Method to set the markFlag to determine if a crossBar's input field
will be carried through to the output field
*/
```

```
-(BOOL)markFlag:(BOOL)newFlag { markFlag = newFlag;

return markFlag;

}

-(BOOL)columnCheck:(int) column { int numSelected, i;

numSelected = 0;

for(i=0; i<numberOfRows; i++)

if(matrix[i][column]) return NO;

return YES;

}

-(BOOL)rowCheck:(int) row { int i;

for(i=0; i<numberOfColumns; i++)

if(matrix[row][i]) return NO;

return YES;

}

@end
```

What is claimed is:

1. An interactive method of controlling the flow of data in computer memory from an input table of rows and columns of data to an output table of rows and columns of data comprising the steps of:

generating a control grid of rows and columns on a display monitor in which each row of said grid is assigned to a respectively different column of said input table and each column of said grid is assigned to a different function that a column of data from said input table may perform in generating said output table;

inserting marks at selected intersections of rows and columns of said grid to set the functions selected columns of the said input table do perform in generating said output table; and controlling generation of said output table from data in respective input table columns selected by marks in accordance with the functions assigned to the respective ones of said grid columns selected by the same ones of said marks.

2. An interactive method of controlling the flow of data in computer memory from an input table of rows and columns of data to an output table of rows and columns of data comprising the steps of:

generating a control grid of rows and columns on a display monitor;
assigning each row of said grid to a respectively different column of said input table;
assigning each column of said grid to a different function that a column of data from said input table may perform in generating said output table;
inserting marks at selected intersections of rows and columns of said grid to set the functions selected columns of the said input table do perform in generating said output table; and
controlling generation of said output table from data in respective input table columns selected by marks in accordance with the functions assigned to the respective ones of said grid columns selected by the same ones of said marks.

3. An interactive method of controlling the flow of data in computer memory from an input table of rows and columns of data to an output table of rows and columns of data in accordance with selected ones of a plurality of predetermined functions that a column of data from said input table may perform in generating said output table, said method comprising the steps of:
generating a control grid of rows and columns on a display monitor;
assigning each row of said grid to a respectively different column of said input table;
assigning each column of said grid to a different one of said predetermined functions;
inserting marks at selected intersections of rows and columns of said grid to set the functions to be performed by selected columns of the said input table in generating said output table; and
controlling generation of said output table from data in respective input table columns selected by marks in accordance with the functions assigned to the respective ones of said grid columns selected by the same ones of said marks.

4. In a computer system which includes both a video display monitor and an input device for manipulating a cursor on the screen of said monitor, an interactive method of controlling the flow of data in computer memory from an input table of rows and columns of data to an output table of rows and columns of data comprising the steps of:
generating a control grid of rows and columns on the screen of said monitor in which each row of said grid is assigned to a respectively different column of said input table and each column of said grid is assigned to a different function that a column of data from said input table may perform in generating said output table;
using said input device to insert marks on the screen of said monitor at selected intersections of rows and columns of said grid to set the functions selected columns of the said input table do perform in generating said output table; and
controlling generation of said output table from data in respective input table columns selected by marks in accordance with the functions assigned to the respective ones of said grid columns selected by the same ones of said marks.

5. An arrangement for controlling the flow of data in computer memory from an input table of rows and columns of data to an output table of rows and columns of data comprising:
means for generating a control grid of rows and columns on a display monitor in which each row of said grid is assigned to a respectively different column of said input table and each column of said grid is assigned to a different function that a column of data from said input table may perform in generating said output table;
means for inserting marks at selected intersections of rows and columns of said grid to set the functions selected columns of the said input table do perform in generating said output table; and
means for controlling generation of said output table from data in respective input table columns selected by marks in accordance with the functions assigned to the respective ones of said grid columns selected by the same ones of said marks.

6. In a computer system which includes both a video display monitor and an input device for manipulating a cursor on the screen of said monitor, an interactive method of controlling the flow of data in computer memory from an input table of rows and columns of data to an output table of rows and columns of data comprising the steps of:
generating a control grid of rows and columns on the screen of said monitor;
assigning each row of said grid to a respectively different column of said input table;
assigning each column of said grid to a different function that a column of data from said input table may perform in generating said output table;
using said input device to insert marks on the screen of said monitor at selected intersections of rows and columns of said grid to set the functions selected columns of the said input table do perform in generating said output table; and
controlling generation of said output table from data in respective input table columns selected by marks in accordance with the functions assigned to the respective ones of said grid columns selected by the same ones of said marks.

7. In a computer system which includes both a video display monitor and an input device for manipulating a cursor on the screen of said monitor, an interactive method of controlling the flow of data in computer memory from an input table of rows and columns of data to an output table of rows and columns of data in accordance with selected ones of a plurality of predetermined functions that a column of data from said input table may perform in generating said output table, said method comprising the steps of:
generating a control grid of rows and columns on the screen of said monitor;
assigning each row of said grid to a respectively different column of said input table;
assigning each column of said grid to a different one of said predetermined functions;
using said input device to insert marks on the screen of said monitor at selected intersections of rows and columns of said grid to set the functions to be performed by selected columns of the said input table in generating said output table; and
controlling generation of said output table from data in respective input table columns selected by marks in accordance with the functions assigned to the respective ones of said grid columns selected by the same ones of said marks.

8. An arrangement for controlling the flow of data in computer memory from an input table of rows and columns of data to an output table of rows and columns of data comprising:

means for generating a control grid of rows and columns on a display monitor;

means for assigning each row of said grid to a respectively different column of said input table;

means for assigning each column of said grid to a different function that a column of data from said input table may perform in generating said output table;

means for inserting marks at selected intersections of rows and columns of said grid to set the functions selected columns of the said input table do perform in generating said output table; and means for controlling generation of said output table from data in respective input table columns selected by marks in accordance with the functions assigned to the respective ones of said grid columns selected by the same ones of said marks.

9. An arrangement for controlling the flow of data in computer memory from an input table of rows and columns of data to an output table of rows and columns of data in accordance with selected ones of a plurality of predetermined functions that a column of data from said input table may perform in generating said output table comprising:

means for generating a control grid of rows and columns on a display monitor;

means for assigning each row of said grid to a respectively different column of said input table;

means for assigning each column of said grid to a different one of said predetermined functions;

means for inserting marks at selected intersections of rows and columns of said grid to set the functions to be performed by selected columns of the said input table in generating said output table; and means for controlling generation of said output table from data in respective input table columns selected by marks in accordance with the functions assigned to the respective ones of said grid columns selected by the same ones of said marks.

* * * * *